US008602175B2

(12) United States Patent
Korkeakangas et al.

(10) Patent No.: US 8,602,175 B2
(45) Date of Patent: Dec. 10, 2013

(54) METHOD AND APPLIANCE FOR COLLECTING ROPE

(75) Inventors: Niko Korkeakangas, Turku (FI); Håkan Bärneman, Solna (SE)

(73) Assignee: Kone Corporation, Helsinki (FI)

(*) Notice: Subject to any disclaimer, the term of this patent is extended or adjusted under 35 U.S.C. 154(b) by 484 days.

(21) Appl. No.: 12/253,787

(22) Filed: Oct. 17, 2008

(65) Prior Publication Data

US 2009/0101448 A1 Apr. 23, 2009

Related U.S. Application Data

(63) Continuation of application No. PCT/FI2007/000101, filed on Apr. 17, 2007.

(30) Foreign Application Priority Data

Apr. 18, 2006 (FI) .................................... 20060371

(51) Int. Cl.

| | |
|---|---|
| ***B66B 7/00*** | (2006.01) |
| ***B66B 7/06*** | (2006.01) |
| ***B66B 19/02*** | (2006.01) |
| ***B23P 19/04*** | (2006.01) |
| *B66B 11/08* | (2006.01) |

(52) U.S. Cl.
USPC .......................................................... 187/414

(58) Field of Classification Search
USPC .......... 187/414; 242/170, 171, 172, 272, 311, 242/377, 386
IPC ..................................... B66B 7/00,7/06, 19/02
See application file for complete search history.

(56) References Cited

U.S. PATENT DOCUMENTS

| | | | | |
|---|---|---|---|---|
| 177,367 | A * | 5/1876 | Bartlett | 137/355.27 |
| 972,222 | A * | 10/1910 | Paul | 242/388.1 |
| 2,220,481 | A * | 11/1940 | Fritts | 242/360 |
| 2,299,521 | A * | 10/1942 | Zierden | 137/355.28 |
| 2,300,243 | A * | 10/1942 | Zierden | 242/387 |
| 2,461,079 | A * | 2/1949 | Peterson et al. | 57/202 |
| 3,949,969 | A * | 4/1976 | Kaufer | 254/333 |
| 4,193,311 | A * | 3/1980 | Rinio et al. | 474/9 |
| 4,651,974 | A * | 3/1987 | Frommherz | 254/294 |
| 4,826,100 | A * | 5/1989 | Belliveau | 242/129 |
| 5,566,901 | A * | 10/1996 | Wilder | 242/532.6 |
| 5,641,138 | A * | 6/1997 | Cronk et al. | 248/99 |
| 6,807,982 | B1 * | 10/2004 | Ames | 137/355.28 |

FOREIGN PATENT DOCUMENTS

| | | | |
|---|---|---|---|
| DE | 3025954 | A * | 2/1982 |
| DE | 3325323 | A1 * | 1/1985 |
| EP | 1591406 | A2 * | 11/2005 |
| FR | 2826352 | A1 * | 12/2002 |
| GB | 1 305 899 | | 2/1973 |
| GB | 1 364 699 | A | 8/1974 |

(Continued)

*Primary Examiner* — William A Rivera
*Assistant Examiner* — Stefan Kruer
(74) *Attorney, Agent, or Firm* — Birch, Stewart, Kolasch & Birch, LLP

(57) ABSTRACT

A method and an appliance for collecting rope are provided, in which the rope is arranged to be collected in a collection container. The rope to be collected is pushed into the collection container through a tubular guide element in such a way that the collection container is made to rotate around its axis of rotation by means of the pushing force of the rope.

16 Claims, 5 Drawing Sheets

(56) References Cited

FOREIGN PATENT DOCUMENTS

Figure 1:
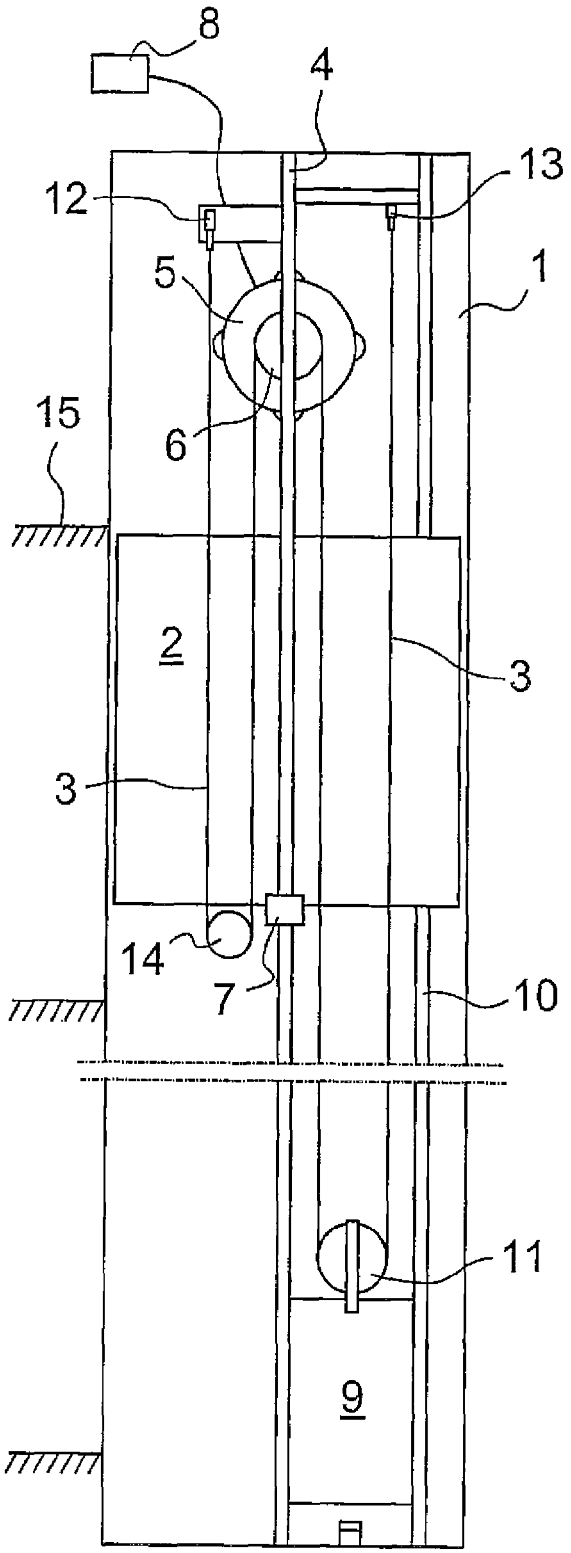

| | | | | |
|---|---|---|---|---|
| JP | 44-30769 | | | 12/1969 |
| JP | 55-117452 | A | | 9/1980 |
| JP | 56-006727 | A | | 1/1981 |
| JP | 03013477 | A | * | 1/1991 |
| JP | 03061276 | A | * | 3/1991 |
| JP | 07-133085 | A | | 5/1995 |
| JP | 11-199157 | A | | 7/1999 |
| JP | 2000-086085 | A2 | | 3/2000 |
| JP | 2003-040551 | A | | 2/2003 |
| JP | 2003-146556 | A | | 5/2003 |
| JP | 2003-238047 | A | | 8/2003 |
| JP | 2005-138917 | A | | 6/2005 |
| JP | 2012056716 | A | * | 3/2012 |
| JP | 2012126516 | A | * | 7/2012 |

* cited by examiner

METHOD AND APPLIANCE FOR COLLECTING ROPE

The present invention relates to a method and an appliance for collecting rope.

The solution according to the invention is particularly suited to collecting the old rope in conjunction with replacing the hoisting ropes of elevators. The hoisting ropes used in elevators wear in use and can even break when they are worn. For this reason the safety regulations for elevators require that the hoisting ropes in elevators with hoisting ropes must be replaced with new ones at certain intervals, or at least if obvious wear or damage is observed. According to prior art the hoisting roping is generally replaced by first removing the old hoisting ropes and after that installing the new hoisting ropes. A drawback of this solution is that replacement of the roping with this method is awkward and takes a lot of time. Especially in elevators in which the suspension ratio is great, e.g. between 4:1-12:1, replacing the ropes with this conventional method is very awkward and slow owing to the numerous diverting pulleys and large rope lengths, nor is it always necessarily safe.

Prior art also includes solutions in which the new ropes are drawn into position by means of the old hoisting ropes. In this case the ends of the old hoisting ropes are detached and the new ropes are attached to their free ends, after which the new ropes are guided into place by pulling on the old ropes. A problem is that this method is only suitable for thin and relatively short ropes, which are so light that they can be pulled into position by human muscle power. This method is not suited to thick and long hoisting ropes.

One prior-art method is to use a pulling device made for this purpose to pull the ropes, which pulls the old ropes out of their position and simultaneously pulls the new ropes into their position. One problem with this is where to lead the old ropes when they are pulled out of their position. One solution is that the ropes are allowed to freely pile up on the bottom of the elevator shaft, onto a certain floor or into some other room. A problem with this solution is that the ropes do not pile up evenly or tidily, they take a lot of space and the ropes can easily become entangled. The ropes also make the room into which they are led dirty. Another solution is to wind the old hoisting ropes either manually or mechanically onto a rotatable reel. When using a manually wound reel, one problem is that an extra person is needed to rotate the reel, which increases the costs of replacing the roping. In addition manual winding is unergonomical work and can possibly also jeopardize work safety. When using a mechanically wound reel, one problem is that the reel possibly needs its own separate power source, which further increases costs. A further problem is that feeding the rope and winding the old rope, i.e. waste rope, does not necessarily work in synchronization, in which case the rope does not necessarily wind onto the reel evenly and tidily. One solution, in which the old hoisting ropes are wound onto a separate reel, is presented in the Japanese patent publication no. JP2003146556. This solution, however, contains the aforementioned problems.

Another Japanese patent publication, no. JP2003238047, presents a different type of solution, in which the old hoisting ropes are also wound onto a reel. In this solution the reel intended for winding the waste rope is connected to the reel feeding the new rope and both reels are rotated by the same machine. One advantage of this is that a separate machine is not needed for the second reel and the reels rotate in synchronization with each other. A drawback, however, is that the machine must be more powerful in order to be able to rotate both reels and this increases costs. Another drawback is one relatively large package that is awkward to handle, which contains a reel for both the old and the new ropes. Yet another drawback is the difficulty of synchronization, because there is a different amount of rope on the reels in different situations, in which case the dimension of the relative circumference of the reels changes. Some technical solution with at least switches and/or gears is needed for synchronization, so as a consequence the solution is expensive and complex, and also more susceptible to malfunction and requires servicing.

Furthermore a problem in all the aforementioned winding solutions is that the dirt and grease detaching from the old hoisting ropes easily make a mess of the room in which the winding takes place. This causes extra cleaning work and also disturbs any people possibly working or moving in the winding rooms, if the winding is performed e.g. on a floor level.

The object of this invention is to eliminate the aforementioned drawbacks and to achieve a simple and low-cost method and appliance for collecting the rope. The purpose of the invention is also to achieve a solution by means of which the old hoisting ropes can easily be collected onto a tidy reel in conjunction with replacement of the hoisting roping. The purpose of the invention is also to improve the ergonomics, safety and tidiness of rope replacement work and to reduce labor costs.

In the method according to the invention the rope to be collected is arranged to be collected in a collection container. The method is characterized in that the rope to be collected is pushed into the collection container in such a way that the collection container is made to rotate around its axis of rotation by means of the pushing force of the rope.

The axis of rotation is described hereafter as a concrete axis, but it can also be conceptualized as an abstract axis of rotation—i.e. as the center axis of a concrete axis.

The method according to one preferred embodiment is characterized in that before being pushed into the collection container the rope to be collected is led into a tubular guide element, which is fitted to guide the rope into the collection container at an inclined and essentially downward-oriented angle.

The method according to a second preferred embodiment is characterized in that in conjunction with the replacement of the elevator rope, the rope to be collected is the old hoisting rope to be removed, which is pushed into the collection container through the guide element with a rope pulling device or by means of gravity, at the same time as the new rope is pulled into position by means of the old rope.

The method according to a third preferred embodiment is characterized in that the rope to be collected is a rope passing through a TIRAK hoist or similar hoist, the free end of which rope is pushed through the guide element into the collection container with the TIRAK hoist or with a similar hoist, at the same time as hoisting work is performed with the hoist.

The method according to a yet another preferred embodiment is characterized in that new rope is fed to the elevator and/or any old hoisting rope is pulled out of the way of the new rope with the rope pulling appliance that acts on the hoisting rope. The rope pulling appliance according to yet another preferred embodiment, with which the rope to be handled is moved, comprises disks pressed towards each other, between which the rope is guided.

The invention also relates to an appliance for collecting rope. The appliance comprises at least a collection container, in which the rope to be collected is fitted to be disposed. The appliance according to the invention is characterized in that the collection container is provided with an axis of rotation, and in that the collection container is fitted to rotate around its axis of rotation while pushing the rope to be collected.

The appliance according to one preferred embodiment is characterized in that the appliance comprises a tubular guide element, through which the rope to be collected is fitted to be led into the collection container.

The appliance according to a second preferred embodiment is characterized in that the guide element is trough-shaped, in which case the rope to be collected is fitted to be led into the collection container along the base and the side edges of the trough-shaped guide element.

The appliance according to a third preferred embodiment is characterized in that the second end of the guide element is fixed immediately above the collection container in such a position with respect to the collection container that the tubular guide element is fitted to guide the rope into the collection container at an inclined and essentially downward-oriented angle.

The appliance according to another preferred embodiment is characterized in that the first end of the guide element is fixed in conjunction with replacement of the elevator rope to the rope pulling device such that the old hoisting rope to be removed can be pushed through the guide element into the collection container with the rope pulling device.

The appliance according to another preferred embodiment is characterized in that the collection container is a cylindrical containers essentially open at the top, provided with a base and an upward-oriented flange.

The appliance according to yet another preferred embodiment is characterized in that a guide element holding the rope in the container is arranged on the upper edge of the collection container, such as one or more separate guide elements or a conical or trough-shaped bending made inward to the edge of the collection container.

The appliance according to yet another preferred embodiment is characterized in that the collection container is provided with a plastic bag or with a similar bag, and in that the old hoisting rope is fitted to wind directly into the bag in the collection container.

The appliance according to yet another preferred embodiment is characterized in that the appliance comprises a rope pulling appliance, which comprises at least a base, to which at least one pulling disk is attached, which pulling disk corresponds to the hoisting rope, and onto which pulling disk the hoisting rope can be fitted, at least one guide roll for holding the hoisting rope in position in the pulling disk, a tightening element for moving the pulling disk in relation to the guide roll and for tightening it into position on the base, and to which appliance at least one electric motor for rotating the pulling disk is fitted.

Some inventive embodiments are also discussed in the descriptive section and in the figures of the present application. The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts. Likewise the different details presented in connection with each embodiment of the invention can also be applied in other embodiments.

One advantage of the solution according to the invention is that when changing the hoisting roping the old hoisting ropes can be easily wound onto a reel automatically and in synchronization without a separate power source. Another advantage is that the winding work is more ergonomic, safer, tidier and cheaper than when done with prior-art methods. A further advantage is that the winding appliance is simple and inexpensive to implement. Yet another advantage of the invention is the opportunity to use the solution according to the invention also for other rope collection purposes. For example a free rope end passing through a TIRAK hoist or similar hoisting appliance can be collected and/or discharged neatly by means of the invention.

Figure 2:
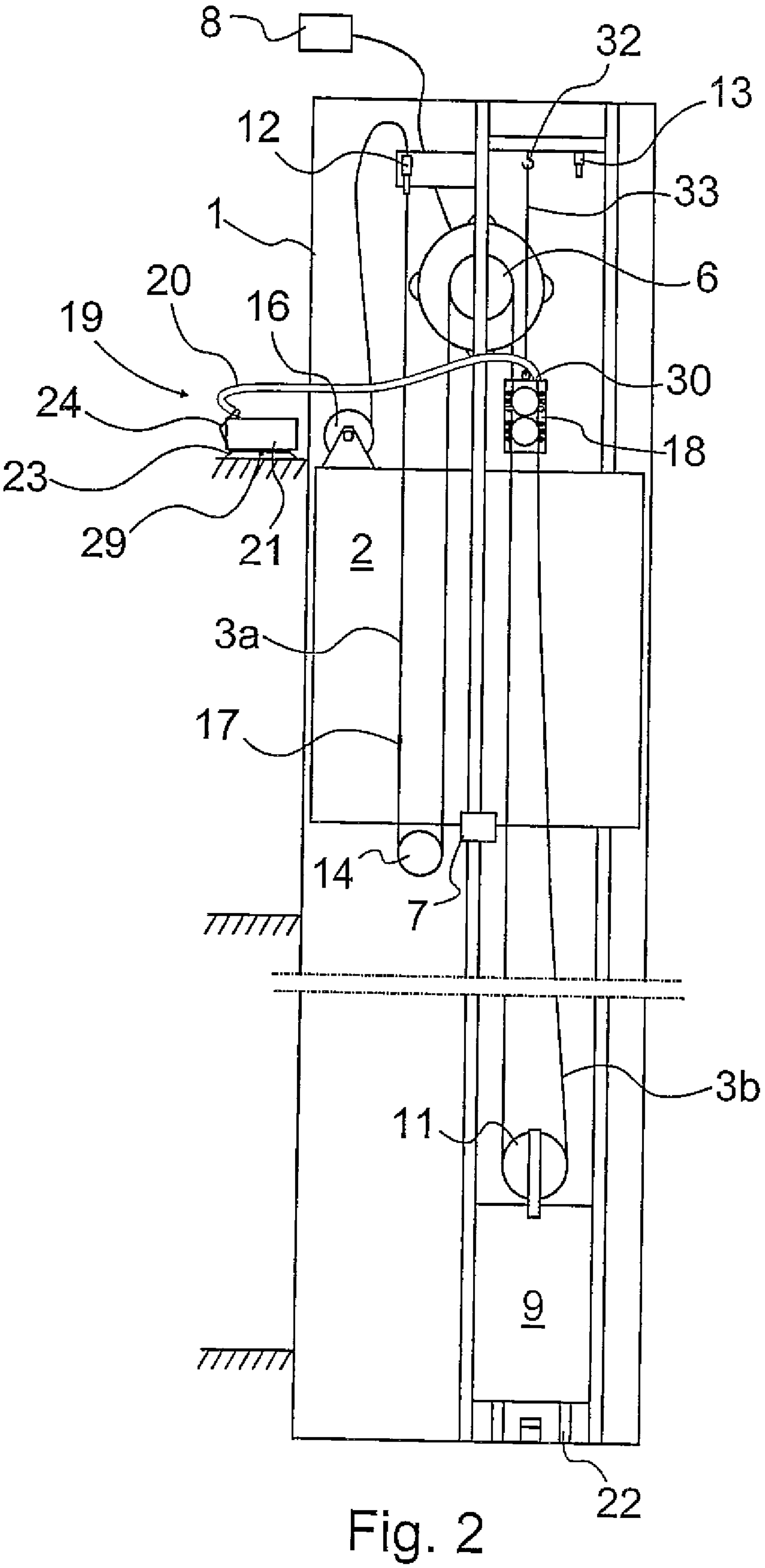
Figure 3:
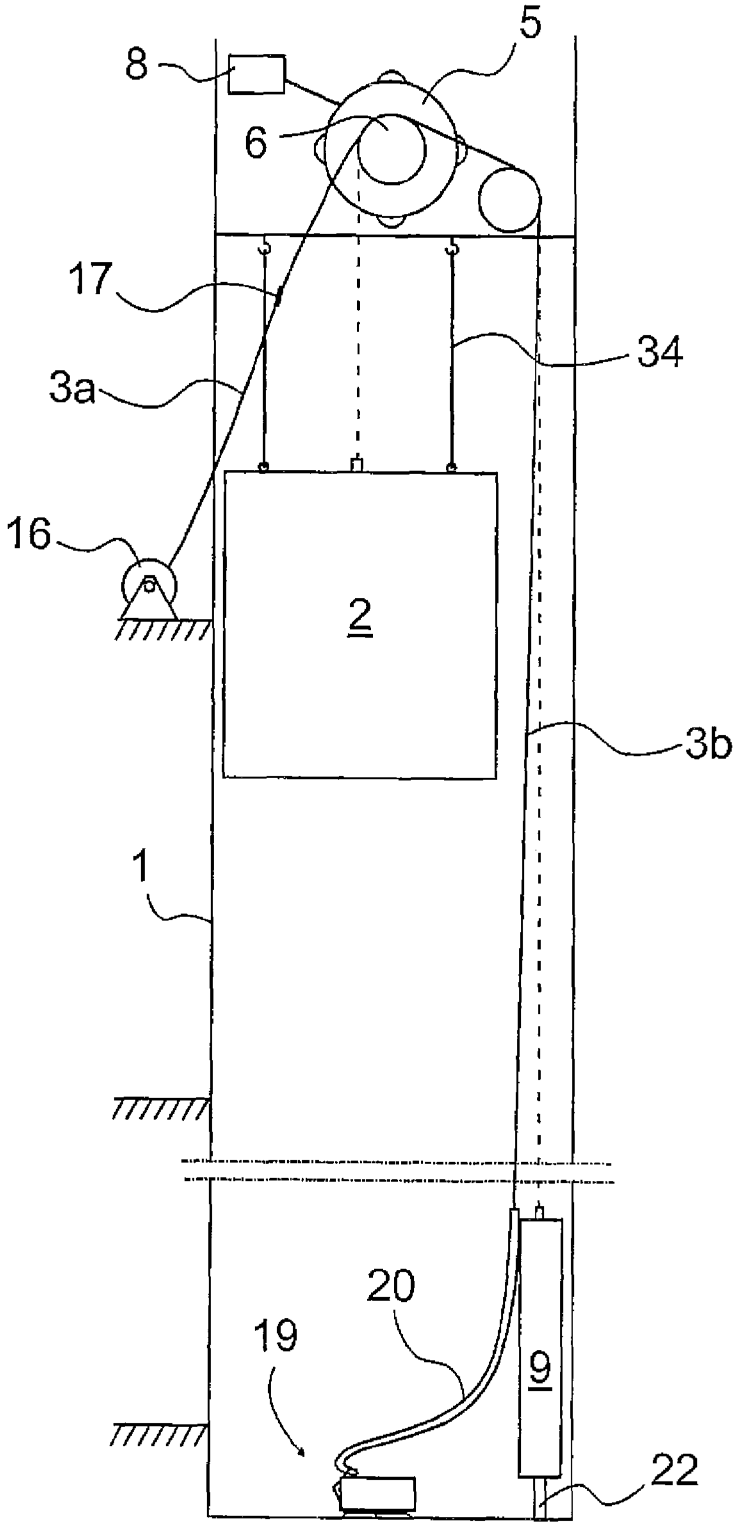
Figure 4:
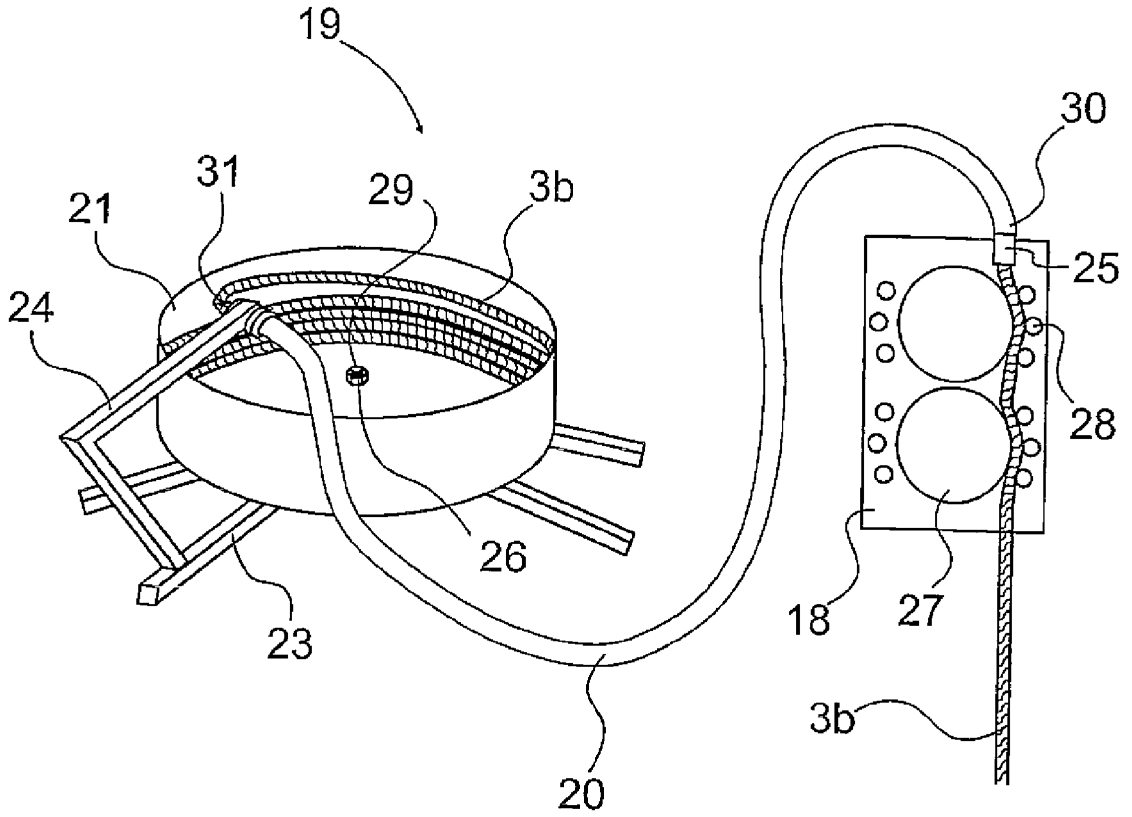

In the following, the invention will be described in more detail by the aid of one of its embodiments with reference to the attached drawings, wherein FIG. 1 presents a simplified side-view of a traction sheave elevator with counterweight, in which the solution according to the invention can be used, FIG. 2 presents an elevator according to FIG. 1, in which the hoisting roping is currently being replaced, FIG. 3 presents another elevator, in which the hoisting roping is currently being replaced and FIG. 4 presents an appliance for collecting rope according to the invention.

Figure 5:
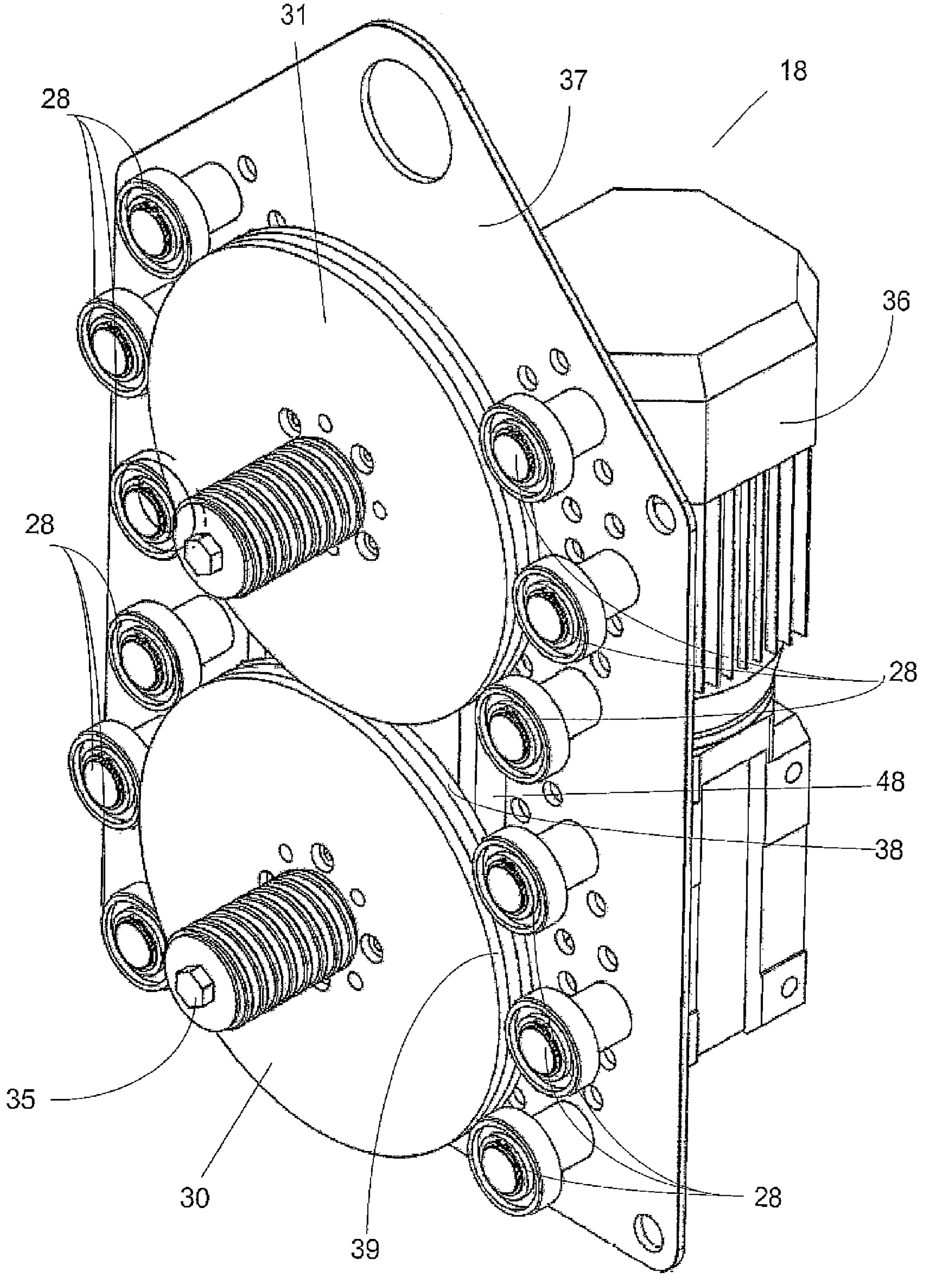

FIG. 5 presents the rope pulling appliance of the appliance according to the invention FIG. 1 presents a simplified side view of a traction sheave elevator equipped with hoisting roping 3 comprised of parallel hoisting ropes and with a counterweight 9, in which the solution according to the invention can be used. The elevator car 2 is suspended on the hoisting roping 3 and it is fitted to move backwards and forwards in the elevator shaft 1 along guide rails 4 in an essentially vertical direction. The elevator receives its lifting power from a hoisting machine 5 provided with a traction sheave 6, which is connected at least to an elevator control system 8. The first end of the hoisting roping 3 is fixed to the fixing element 12 disposed in the upper part of the elevator shaft 1, from where the hoisting roping is led to pass first under the elevator car 2 around the diverting pulley 14 to the traction sheave 6 of the hoisting machine 5 in the upper part of the elevator shaft, from where the hoisting roping 3 is further led to travel to the diverting pulley 11 of the counterweight 9, and after passing around the diverting pulley 11 the roping is led to the fixing point 13 disposed in the upper part of the elevator shaft, to which the second end of the hoisting roping is fixed. The elevator shaft 1 in FIG. 1 is truncated in such a way that of the floor levels only the bottommost, the next to topmost and the topmost floor 15 are visible. The rope suspension can of course also be different to that described.

FIG. 2 presents an elevator according to FIG. 1, in which the old hoisting roping is currently being replaced with new hoisting roping. The hoisting roping is replaced in this case such that the new parallel hoisting ropes are pulled one at a time into position by means of the old hoisting ropes and a pulling device 18 suspended from a suitable fixed point, from which the pulling device is suspended in position in the preparation phase of the replacement. Preferably the pulling device 18 is suspended e.g. on the ceiling of the elevator shaft or on the suspension point 32 on the beam situated close to the ceiling by means of a suspension rope, a suspension chain or a similar support element 33.

In the preparation phase of the replacement the elevator car 2 is also driven to a location in the shaft suited to the replacement, which in the elevator of the example is in the upper part of the elevator shaft. After this the counterweight is supported in position, the car is lifted upwards e.g. with a block and tackle to achieve a suitable overtravel distance and the car is locked into its position by means of the safety gears. The elevator car 2 is driven e.g. to a location where the roof of the car is essentially at the level of the topmost floor 15 and the car is locked into position e.g. by means of the safety gear 7 of the elevator. In addition the stationary position is ensured with a safety chain or in another suitable manner. Correspondingly the counterweight 9 is in this case in the lower part of the elevator shaft 1, where it is supported e.g. on the floor of the shaft by means of support elements 22. When the elevator car 2 is locked into position, the pulling device 18 is fastened to the rope to be replaced 3*b* on both sides such that the rope leaving the traction sheave 6 of the elevator machinery down to the counterweight 9 is fitted between the pulling disks of the pulling device 18 and the support rolls on the left-hand side of the pulling device 18 and correspondingly the rope going up from the counterweight 9 to the fixing point 13 is fitted between the pulling disks of the pulling device 18 and the support rolls on the right-hand side of the pulling device 18. Before starting the replacement the hoisting ropes of the new hoisting roping that is still on reels 16 are taken to the roof of the elevator car 2 or to another suitable place, e.g. to a floor.

When everything is ready for starting the replacement the first old hoisting rope 3*b* is cut below the fixing point 13 of the second end and the cut end of the rope remaining above the pulling device 18 is threaded into the tubular guide element 20 of the rope collection appliance 19 from the free end of the guide element, after which the free end of the guide element is fastened to the top part of the pulling device 18. After this the same old rope 3*b* is cut from its fixing point 12 of the first end, i.e. on the side of the elevator car 2, and the new rope 3*a* is joined to the cut end of the old rope 3*b* by means of a joint element. After this the new rope 3*a* is pulled into its position by means of the pulling device 18 and the old rope 3*b*. At the same time the old rope 3*b* is allowed to wind through the guide element 20 to the collection container 21 of the rope collection appliance situated on the topmost floor 15.

Pulling of the ropes 3*a* and 3*b* with the pulling device 18 is continued until the joint location 17 of the ropes comes through the pulling device and the guide element 20 so far that the end of the new hoisting rope 3*a* definitely reaches the fixing point 13 after the rope is removed from the pulling device 18 and the guide element 20. After this the pulling device 18 is stopped and the new hoisting rope 3*a* is cut at a suitable point. The end of the guide element 20 is detached from the pulling device 18 and the end of the new hoisting rope 3*a* is pulled out of the guide element 20, cut such that the old rope 3*b* detaches from the new rope 3*a* and the new rope 3*a* is fixed to its fixing point 13. Next the new hoisting rope 3*a* is suitably cut also at its end on the side of the elevator car 2 and fixed to its fixing element 12, after which the rope is freed from the pulling device 18. All the parallel hoisting ropes are replaced with the same method and finally the rope tightnesses are equalized such that no loose sections remain in the new hoisting roping. After this the elevator car 2 and the counterweight 9 are detached from their supports and driven the necessary equalization runs and if necessary the rope tightnesses are again equalized and other necessary finishing procedures are performed.

In the situation presented by FIG. 2 the pulling device 18 has had time to pull the rope some distance so that the joint location 17 of the old and the new hoisting rope is slightly above the diverting pulley 14 situated below the elevator car 2.

FIG. 3 presents a diagrammatic and simplified view of an elevator with 1:1 suspension and the replacement of the hoisting ropes to be performed in it, in which the replacement is currently in progress. The hoisting roping is replaced in this case such that the new parallel hoisting ropes 3*a* are pulled one at a time into position by means of the old hoisting ropes 3*b*. In FIG. 3 the position of the old hoisting rope that is still in place is presented with a dashed line. At least the following actions have been performed in the preparation stage: the elevator car 2 has been locked to the guide rails close to the topmost floor e.g. with the safety gear and the stationary position has additionally been ensured with at least one safety chain 34 or in another suitable manner. Correspondingly the counterweight 9 is in this case in the lower part of the elevator shaft 1, where it is supported e.g. on the floor of the shaft by means of support elements 22. In addition the reels 16 of the new hoisting ropes are disposed on the topmost floor or in another suitable location and the rope collection appliance 19 according to the invention is disposed in the lower part of the shaft 1, e.g. on the bottom of the shaft, the tubular guide element 20 of which rope collection appliance, or at least the top part of it, is placed in an essentially vertical position and the top end of the guide element is e.g. fixed to the top edge of the counterweight such that the old hoisting rope 3*b* can be threaded from above inside the guide element 20 from the mouth aperture.

When the preparations are completed the first old hoisting rope 3*b* is cut above the elevator car 2 and the new hoisting rope 3*a* coming from the reel 16 is joined to the cut end. After this the old hoisting rope 3*b* is cut above the counterweight 9 and the cut end is threaded from the top end of the tubular guide element 20 inside the guide element. When after this the new rope 3*a* is released from the reel 16 the old rope 3*b* slides under its own weight along the guide element 20 into the collection container 21 of the collection appliance 19, pulls the new rope 3*a* along with it, rotates the collection container around its axis of rotation 29 and winds onto the inner edge of the collection container 21 in the same way as earlier described in the example.

When the new rope 3*a* has come far enough, the pulling is stopped and the rope is cut at both ends and the ends are fixed in their positions on both the elevator car 2 side and the counterweight 9 side. All the parallel hoisting ropes are replaced with the same method and finally the rope tightnesses are equalized such that no loose sections remain in the new hoisting roping. After this the elevator car 2 and the counterweight 9 are detached from their supports and the necessary equalization runs are driven and if necessary the rope tightnesses are again equalized and other necessary finishing procedures are performed.

FIG. 4 presents an appliance 19 according to the invention for collecting the old rope as well as the rope pulling device 18. The pulling device 18 comprises e.g. two pairs of pulling disks 27, on the sides of which are fitted support rolls 28. The pulling device 18 is arranged to operate such that the rope to be pulled is placed and compressed between the pulling disks and the support rolls, and when the pulling disks 27 are rotated the pulling device 18 pulls the rope between the pulling disks and the support rolls. The pulling appliance is described elsewhere in the present application.

The guide element 20 included in the appliance 19, which in this presented embodiment is e.g. a plastic pipe, is fitted to be fixed at its first, i.e. free, end 30 to the top part of the pulling device 18 by means of the fixing element 25. The fixing element 25 can be e.g. a sleeve, through which the hoisting rope 3*b* is led inside the guide element 20 when the rope begins to be pulled with the pulling device 18. The appliance 19 also includes a collection container 21, which can be placed e.g. on the floor of a landing or in another suitable location resting on its support structure 23. The collection container 21 is a cylindrical container, essentially open at the top, provided with a base and an upward-oriented flange. The old rope staying in the collection container 21 during the replacement can be ensured with the shape of the flange of the collection container or with separate guide elements. The flange can be e.g. of conical shape tapering upwards or on the top edge of the flange can be a trough-like or similar bending made inwards.

The support structure 23 comprises four e.g. metal supporting legs, which join under the centre point of the collection container 21 and the collection container 21 is fixed at essentially the centre point of its base to the support structure 23 by means of both the axis of rotation 29 and the fixing element 26 such that the collection container 21 can rotate freely around its essentially vertical axis of rotation 29. The collection container 21 is either fastened with bearings to the axis of rotation 29 or the collection container is fixed to the vertical axis 29 and the vertical axis 29 is fastened with bearings to the support structure 23. A support element 24, which is also made e.g. of metal, is fixed at its first end to one of the legs of the support structure 23. The support element 24 is fitted to extend at its free end suitably over the collection container 21 and the second end 31 of the guide element 20 is fixed to the free end of the support element 24 at an inclined attitude both vertically and horizontally to the inner surface of the cylindrical part of the collection container. In this case the second end 31 of the guide element 20 is at such an angle in relation to the inner surface of the cylindrical part that the rope coming through the guide element meets the inner surface of the flange of the collection container 21 substantially almost tangentially and at the same time is directed downwards.

The appliance 19 according to the invention operates in such a way that when the pulling device 18 starts to pull the old hoisting rope 3*b* out of its position and at the same time the new hoisting rope 3*a* into its position, the pulling device 18 pushes the old rope 3*b* inside the guide element 20 from the first end of the guide element. When the pulling device 18 has pulled the new rope some distance, the old rope 3*b* has passed inside the guide element 20 to the second end 31 of the guide element. When the end of the old hoisting rope 3*b* comes out of the second end 31 of the guide element 20, it is led into the collection container 21 at a suitably inclined acute angle so that the end of the rope meets the inner surface of the cylindrical part of the collection container 21 at an inclined angle, in which case the collection container 21 starts to rotate as a result of the force transmitted by the rope around the axis of rotation 29 at the same time winding the old hoisting rope 3*b* inside it as the rope comes out of the guide element 20. The appliance 19 thus operates in synchronization with the pulling device 18 and a dedicated power source in it is not required.

According to one preferred embodiment the rope pulling device 18 does not need to be against the guide element 20 as presented in FIG. 4 or in its vicinity. In these kinds of situations the rope is led into the collection container 21 via the guide element 20 by means of gravity and the pulling device 18 can be elsewhere in the elevator shaft than in the vicinity of the guide element 20 that feeds the rope.

With the method according to the invention the rope is collected e.g. as follows: at first the rope 3*b* is led inside the guide element 20 from the first end 30 of the guide element. After this the rope 3*b* is pushed forward inside the guide element 20 until the end of the rope 3*b* comes out of the second end 31 of the guide element. From here the rope 3*b* is pushed into the collection container 21 at a suitably inclined downward angle such that the rope meets the inner surface of the collection container 21 and the collection container 21 is made to rotate around its axis of rotation 29 by means of the pushing force of the rope 3*b*. Pushing of the rope 3*b* into the collection container 21 is continued for the desired time, during which the rope 3*b* winds into a tidy coil inside the collection container 21.

The collection container 21 can also be equipped with a plastic bag or with a similar bag, in which case the old hoisting rope is fitted to wind directly into the bag in the collection container 21. In this case the old rope can be collected tidily and the whole rope is in a bag, the bag containing the rope is removed and a new bag is placed in the collection container for the next rope. By means of the bag the rope can easily be transferred to further handling.

According to one embodiment instead of a tubular guide element the guide element can be at least partly another shape than a tube. In this case the guide element can be e.g. trough-shaped so that the rope is guided into the collection container along the bottom and the side edges of the trough of the guide element. The collection container can also be a basket or similar or also a temporary container constructed in a frame, e.g. a container that has a detachable base or an edge piece of the frame that can be bent inside.

FIG. 5 presents a diagrammatic illustration of a rope pulling device 18 according to the invention. The rope pulling appliance of the rope collection appliance according to the invention is based on traction through friction, which is achieved by compressing with the desired spring force one or more two-part pulling disks such that the disks 38, 39 press against each other. The disks 38, 39 are shaped such that the rope endeavors to run on the outer rim of the pulling disk. This is preferably implemented such that the edges of the disks on the rim side are beveled, at least at the point where they face each other, in which case a gap remains between the disks 38, 39 in the manner illustrated in FIG. 5, which widens towards the rim. The disks 38, 39 seek by means of the force of the spring 35 a state of equilibrium for themselves and for the rope between them wherein the rope travels between them and rests against the guide rolls 28, by means of especially the radial force component produced by the bevel. The appliance thus contains guide rolls 28 on the outer rim of the disks, with which the rope is kept between the disks 38, 39 during pulling of the rope and by means of which the rope is deflected such that a controlled contact is achieved between the rope and the pulling disk 30, 31. The grip of the appliance is based on spring force, which can be achieved in a controlled and repetitive manner, after placement of the rope, and which is implemented by means of the tightening spring 35. The tightening spring 35 is preferably situated in the manner illustrated in FIG. 5 outside the disk stack formed by the disks 38, 39 on the axis of rotation of the disks to co-axially press the disks towards each other. In this case the rope groove formed between the disks is able to adapt to fluctuations in the thickness of the rope, because the disks 38 and 39 can move axially in respect to each other against the spring force of the tightening spring 35. The rope pulling device can contain more than one pulling disk. For example, it is also possible to manufacture a version of the rope pulling device 18, with which all the ropes can be pulled simultaneously. When there are more than one pulling disk 30, 31, they are preferably joined by a power transmission 48, which is preferably a chain, a belt, a cogged belt or a rack and pinion.

The guide rolls 28 are preferably situated on two sides of the pulling disk 30, 31 in opposing positions to each other. In this case the rope feeding device 18 can move ropes on opposite sides of the pulling disk simultaneously in different directions. Of course the device can also be utilized such that only one side is used, in which case the roll on the other side is not needed. In the figures 3 units of the guide rolls are presented on both sides of the pulling disk, but it is obvious that there can be a different amount of them, e.g. one or more, but preferably 2 units on both sides. The rolls according to one preferred embodiment might reach partly between the disks 38, 39. The rope can consequently pass more deeply between the disks 38, 39, in which case the passage of especially a rope extension is facilitated. This can be implemented such that the guide roll 28 is so narrow that it fits between the disks 38, 39. Alternatively the guide roll tapers towards the outer rim or includes on its outer surface a narrower ridge than the gap between the pulling disks. Yet another method of implementation is to install a separate bushing around the guide roll 28 to form a narrow section on the rim of the disks.

Advantages and properties of the rope pulling device:

- It is possible to pull/feed the rope on both sides simultaneously
- Controlled rope movement at all times
- It does not damage the rope
- The same machine functions for all rope diameters
- It is possible to pull a rope extension through the machine
- It can grip the rope, also a closed loop
- It is not necessary to thread the rope through the device
- Enables e.g. fixing of the rope to the rope wedge while the pulling machine supports the rope
- Able to directly grip a taut rope
- Sure grip on the rope and always the same gripping ability
- Gripping ability is independent of the fitter, because the bolt of the spring in the device is always tightened to the full
- Possible to restrict the pulling capability of the device to be less than the gripping capability or the durability of the rope extension
- No falling ropes
- Possible to adjust the speed of the device steplessly
- Possible to drive rope in both directions with the grip remaining the same
- Synchronized operation with the rope winding device
- Winding of the old rope can be implemented without a motor pushed by the rope to be collected It is obvious to the person skilled in the art that the invention is not limited solely to the examples described above, but that it may be varied within the scope of the claims presented below. Thus for example the appliance according to the invention can be used in another connection than in replacing the hoisting roping of an elevator. As previously mentioned the appliance can be used e.g. for winding the tail rope of a TIRAK hoist or for collecting surplus rope for another suitable purpose.

It is further obvious to the person skilled in the art that the elevator car suspension presented can be different to what is described above. The positioning and number of the diverting pulleys can vary and the compensation appliance can also be in the upper part of the elevator shaft, in which case certain details of the rope replacement are different than those explained in the examples above. Furthermore the suspension ratio and the method of suspension can be other than what is presented above. Likewise it is also obvious to the person skilled in the art that the sequence of the different phases of the method can differ to that presented. Neat winding of the old rope into the collection container as the old rope itself rotates the collection container is essential however.

Likewise it is further obvious to the person skilled in the art that the construction of the pulling device used in the replacement of the hoisting ropes of an elevator can differ to what is presented above. Thus the friction surface of the pulling disk can be any suitable material whatsoever that possesses adequate friction, such as a polymer i.e. for example rubber, urethane or a metal such as e.g. steel. There can be serration or some other suitable friction surface on the rim of the lifting wheel instead of V-grooves. Likewise the pulling appliance can be positioned in a different place to what is presented above. In this case the pulling device can be fixed to a supporting structure suited to any situation at all. It is also obvious that collection of the rope into the collection container can be implemented without a separate motorized rope pulling appliance. In this case the utilization of gravitational force is very preferable. The traction sheave of the elevator can be used as an aid. It is in addition obvious that the invention can be utilized also in a situation in which the new ropes are not put into the place of the old ones, but instead the ropes are only run into the collection container and collected.

It is further obvious to the person skilled in the art that depending on the suspension solution of the elevator the reels of the new ropes can be placed also elsewhere than on the roof of the elevator or on the topmost floor, e.g. on the bottommost floor, in which case the counterweight is supported e.g. at the top end of the shaft.

The invention claimed is:

1. A method of replacing an existing elevator hoist rope, for an elevator system installed in a structure having plural floors accessed by the elevator, with a replacement elevator hoist rope, comprising:

providing a portable rotatable collection container for elevator rope at any of a plurality of locations in the structure;

connecting an end of the existing elevator hoist rope to an end of the replacement hoist rope;

providing a selectively, independently driven portable rope pulling device, the selectively, independently driven portable rope pulling device being configured to pull the connected existing and replacement hoist ropes in two substantially opposite directions inside of the selectively, independently driven portable rope pulling device for installation of the replacement rope in the elevator system and to feed the existing hoist rope to the portable rotatable collection chamber, wherein the selectively, independently driven portable rope pulling device is positioned between at least one rope diverting pulley and a source of the replacement elevator rope;

providing a guide element between the selectively, independently driven portable rope pulling device and the portable collection container for guiding the replacement hoist rope with respect to the portable collection device;

cutting the existing elevator rope at a point above the selectively, independently driven portable rope pulling device along the feeding direction to form a collected end of the existing elevator rope, wherein the collected end is directly pushed into the guide element by at least a feeding force generated by the selectively, independently driven portable rope pulling device; and pushing the rope to be collected into the collection container in such a way that the collection container is made to rotate around an axis of rotation thereof by means of the pushing force of the rope.

2. The method according to claim 1, wherein the replacement hoist rope is pulled into position by means of the old hoisting rope.

3. The method according to claim 2, wherein the replacement hoist rope is fed to the elevator and/or any old hoisting rope is pulled out of the way of the new rope with the rope pulling device.

4. The method according to claim 1, wherein before being fed into the collection container, the existing hoist rope is led into a tubular guide element that is fitted to guide the rope into the collection container at an inclined and essentially downward-oriented angle.

5. The method according to claim 1, wherein the rope to be collected is an existing hoist rope passing through a hoist, a free end of the rope to be collected being pushed through the guide element into the collection container with the hoist, at the same time as hoisting work is performed with the hoist.

6. The method of claim 1, wherein the portable rope feeding device is suspended by a rope.

7. A system for replacing an existing elevator system hoist rope, the elevator system being installed in a structure having plural floors accessed by the elevator, comprising:

a portable rotatable collection container for elevator rope adapted to be placed at any of a plurality of locations in the structure;

a replacement elevator rope connected to an existing elevator rope;

a selectively, independently driven portable rope pulling device adapted to be placed at any of a number of positions in the elevator system and configured to pull the connected existing elevator rope and replacement hoist rope in two substantially opposite directions inside of the selectively, independently driven portable rope pulling device for installation of the replacement rope in the elevator system and to feed the existing hoist rope to the portable rotatable collection chamber, wherein the selectively, independently driven portable rope pulling device is positioned between at least one rope diverting pulley and a source of the replacement elevator rope;

a guide element provided between the selectively, independently driven portable rope pulling device and the portable collection container for guiding the replacement hoist rope with respect to the portable collection device; and wherein the portable rotatable collection container is adapted to rotate around an axis of rotation in response to a pushing force of the replacement hoist rope being fed thereto by the selectively, independently driven portable rope pulling device, and wherein the existing elevator rope includes a collected end formed by cutting the existing elevator rope at a point above the selectively, independently driven portable rope pulling device along the feeding direction, and the selectively, independently driven portable rope pulling device is configured to directly push the collected end into the guide element.

8. The system according to claim 7, wherein the system includes a tubular guide element, through which the rope to be collected is fitted to be led into the collection chamber.

9. The system according to claim 7, wherein the guide element is trough-shaped, and the rope to be collected is fitted to be led into the collection container along the base and the side edges of the trough-shaped guide element.

10. The system according to claim 7, wherein one end of the guide element is fixed immediately above the collection container in such a position with respect to the collection container that the guide element is fitted to guide the rope into the collection container at an inclined and essentially downward-oriented angle.

11. The system according to claim 7, wherein a first end of the guide element is fixed in conjunction with replacement of the elevator rope to the rope pulling device such that an old hoisting rope to be removed can be pushed through the guide element into the collection container with the rope pulling device.

12. The system according to claim 7, wherein the collection container is a cylindrical container, essentially open at the top, provided with a base and an upward-oriented flange.

13. The system according to claim 7, wherein the guide element is arranged on an upper edge of the collection container, the guide element being one or more separate guide elements or a conical or trough-shaped bending made inward to the edge of the collection container.

14. The system according to claim 7, wherein the collection container is provided with a bag, and an existing hoisting rope is fitted to wind directly into the bag in the collection container.

15. The appliance according to claim 7, wherein the appliance comprises a rope pulling appliance, which comprises at least a base, to which at least one pulling disk is attached, the pulling disk corresponding to the hoisting rope, and onto which pulling disk the hoisting rope can be fitted, at least one guide roll for holding the hoisting rope in position in the pulling disk, a tightening element for moving the pulling disk in relation to the guide roll and for tightening the pulling disk into position on the base, and to which appliance at least one electric motor for rotating the pulling disk is fitted.

16. The system of claim 7, wherein the portable rope feeding device is suspended by a rope.

* * * * *